United States Patent

Fairbanks

[15] 3,689,617
[45] Sept. 5, 1972

[54] METHOD FOR EXTRUSION OF INTERLACED WEBS

[72] Inventor: Theodore H. Fairbanks, Liverpool, Pa. 17045

[73] Assignee: FMC Corporation, Philadelphia, Pa.

[22] Filed: Feb. 5, 1971

[21] Appl. No.: 112,945

Related U.S. Application Data

[63] Continuation-in-part of Ser. No. 793,731, Jan. 24, 1969, Pat. No. 3,600,751.

[52] U.S. Cl. .................. 264/103, 87/12, 87/53, 156/167, 161/DIG. 6, 264/167, 264/DIG. 81
[51] Int. Cl. .................. D04g 1/00, D02g 1/20
[58] Field of Search .......... 264/167, 103, DIG. 81; 18/12 N, 13; 161/DIG. 6; 87/12, 53; 156/167

[56] References Cited

UNITED STATES PATENTS

| | | | |
|---|---|---|---|
| 3,012,275 | 12/1961 | Nalle | 264/DIG. 81 |
| 3,360,410 | 12/1967 | Romanin | 156/181 |
| 3,562,046 | 2/1971 | Grey | 156/167 |
| 3,579,729 | 5/1971 | Fairbanks | 18/12 N |
| 3,591,892 | 7/1971 | Fairbanks | 264/167 |
| 3,591,894 | 7/1971 | Fairbanks | 264/167 |
| 3,331,903 | 7/1967 | Mine | 264/167 |

FOREIGN PATENTS OR APPLICATIONS 380,369  9/1964  Switzerland ........ 264/DIG. 81

*Primary Examiner*—Jay H. Woo
*Attorney*—Thomas R. O'Malley, George F. Mueller and Eugene G. Horsky

[57] ABSTRACT

A method of making a woven web by extruding a series of spaced streams of flowable strand-forming material in each of two laterally spaced, parallel planes, with the streams in one of such planes being staggered with relation to the streams in the other of such planes. These streams are then moved simultaneously, first transversely in such planes with the streams in one of such planes moving in a direction opposite to the streams in the other of such planes, and then in a direction substantially perpendicular to such planes. The extruded streams are set preferably prior to contact therebetween.

7 Claims, 13 Drawing Figures

METHOD FOR EXTRUSION OF INTERLACED WEBS

This application is a continuation-in-part of my application Ser. No. 793,731, filed Jan. 24, 1969, now U.S. Pat. No. 3,600,751.

The present invention relates to a method for making woven webs or net-like structures by interlacing strands during the extrusion thereof.

My U.S. Pat. No. 3,525,785 discloses a method and apparatus for making a woven or net-like structure in which a series of spaced streams of flowable strand-forming material is extruded in each of two spaced surfaces, with the streams of each series being moved transversely of the direction of extrusion along its respective surface and with one series of streams moving in a direction opposite to the other series of streams. In this manner, the two series of streams cross but do not contact each other. At locations which alternate with the locations at which the streams cross, the two series of streams simultaneously exchange surfaces along which the streams thereof are extruded to thus provide for an interlacing of the extruded streams.

With the method and apparatus disclosed in the abovenoted patent, the exchange of an individual stream of the respective series thereof from one surface to the other is actually achieved by concomitantly extruding contacting portions of such individual stream in each of the two surfaces, gradually reducing the extrusion of such stream in one surface and simultaneously and gradually increasing the extrusion of the same in the other of such surfaces. This exchange of extruded streams from one surface to another, as described above and in greater detail in the cited patent, necessitates precise equipment and carefully controlled operating conditions. Accordingly, a primary object of this invention is to provide a generally new or improved and more satisfactory method for making webs or net-like structures by extrusion.

Another object of this invention is a method for making woven webs or net-like structures by interlacing strands during their continuous extrusion from a plurality of individual and independent orifices.

Still another object is the provision of an improved method which is adapted for continuous and economical manufacture of woven webs or net-like structures by extrusion.

A further object is the provision of a method for making bulky woven webs or net-like structures by extrusion.

A still further object of this invention is a method which is capable of producing, by extrusion, woven webs or net-like structures having different patterns therein.

These and other objects are accomplished in accordance with the present invention by a method in which a series of spaced streams of flowable strand-forming material are extruded in each of two laterally spaced, generally parallel vertical planes from individual extrusions openings, with the streams in one of such planes being staggered with relation to the streams in the other of such streams. By shifting individual extrusion openings, streams in each of these planes are moved at their points of extrusion, like distances and simultaneously, first transversely in such parallel planes with streams in one of such planes moving in a direction opposite to and crossing with streams in the other of such planes whereby the streams in the two planes cross without contacting, and then perpendicularly to such planes, with individual streams moving bodily from each of such planes to the other thereof. By repeating the above sequence of movements, the streams are interlaced without contacting each other and, when set, provide a woven pattern of strands.

In the practice of the method of the present invention, each series of streams contains the same number of streams and, except for the outermost streams of the two series of streams and the streams adjacent thereto, the spacing of streams in both series of streams is substantially equal and alike. The transverse movement of the streams in the parallel planes of extrusion is equal to at least one-half of the spacing between the adjacent streams in the respective series. The distance of movement of the streams from one plane to the other will depend, of course, upon the spacing between such planes.

As noted above, each series will have the same number of streams and the streams of one series will be staggered relative to the streams in the other of such series. With the exception of the two outermost streams of these two series of streams, the streams of each respective series are moved in the same direction transversely in the parallel planes of extrusion after each movement or transfer thereof from one plane to the other. That is, those streams between the outermost streams of the two series of streams which travel, for example, to the left in one of such parallel planes when moved transversely therein will also travel to the left when moved transversely while in the other of such parallel planes.

On the other hand, the directions of travel of the outermost streams of these two series of streams, when moved transversely in the parallel planes of extrusion, are reversed after their movement or transfer from one of such planes to the other. More particularly, one of such outermost streams will travel to the right while the other will travel to the left when moved transversely in the parallel planes of extrusion. After these respective streams have been moved or transferred to the plane previously occupied by the other and moved transversely in such planes, the stream which had previously traveled to the right will now travel to the left while the stream which heretofore traveled to the left will now travel to the right.

The apparatus employed in the method of the present invention includes a plurality of spaced extrusion plates each having an opening extending therethrough, means for continuously delivering flowable strand-forming material to the openings in the extrusion plates and means for moving the extrusion plates horizontally along sinuous paths which are 180° out of phase with each other and symmetrical relative to a common vertical plane, with the movement of extrusion plates along one of such sinuous paths being opposite to the movement of extrusion plates along the other of such sinuous paths. More particularly, the opening in each of the respective extrusion plates is disposed centrally thereof and the means for delivering flowable strand-forming material to such openings includes a housing having side walls and a slotted bottom wall, with the extrusion plates being movable relative to the housing bottom wall. The extrusion plates are maintained in proper spaced apart relationship by filler or spacer plates which are movable along the sinuous paths together with the extrusion plates. Both the extrusion and filler plates are of like rectangular, and more specifically, square configuration and together cover the slotted portion of the housing bottom wall. MOvement of both the extrusion and filler plates is achieved by push rods which extend through the housing side walls and are driven in a predetermined sequence, as by cams.

The slotted portion of the bottom wall of the housing includes a pair of substantially parallel, like, elongated slots extending longitudinally thereof, and a series of longitudinally spaced cross slots extending perpendicularly between the elongated slots. These slots together define sinuous paths which are alike, but 180° out of phase with each other, along which the extrusion and filler plates are together moved.

The operation of the above-described apparatus may commence, for example, from a starting position in which the openings in the extrusion plates are located over the elongated slots in the housing bottom wall, and in alignment with cross-slots, with the extrusion plate openings overlying one of such elongated slots alternating with the openings in the extrusion plates which overlie the other of such elongated slots. Filler plates occupy areas between the extrusion plates and cover the remaining sections of the housing bottom wall slots.

With the extrusion and filler plates arranged as described above, flowable strand-forming material delivered into the housing will issue as shaped streams from individual extrusion plate openings and will pass unobstructed through the slots in the housing bottom wall. The extrusion and filler plates are then moved by push rods transversely to the direction of extrusion along the respective elongated slots in the housing bottom wall. All of the extrusion plates are moved at the same rate of speed and to the same degree, but with the extrusion plates over one of the elongated slots moving in a direction opposite to the extrusion plates which are over the other of such elongated slots. As a result, the streams issuing from the extrusion plates which are over one of the elongated slots in the housing bottom wall will cross or pass the streams discharged from the extrusion plates which are over the other of such elongated slot, without any contact between such crossing streams.

The above-described movement of the extrusion plates is stopped when openings in individual extrusion plates are aligned with separate cross slots in the housing bottom wall. Push rods then urge extrusion plates perpendicularly to the direction of extrusion, with adjacent extrusion plates moving at the same rate of speed but in opposite directions, until the openings therein are aligned with the elongated slots in the housing bottom wall. The alignment of extrusion plate openings with the cross slots in the housing bottom wall, assures the extrusion of continuous streams of strand-forming material therefrom and, since adjacent of such openings travel in opposite directions, such extruded streams cross or pass each other without any contact therebetween.

By the last-described movement the extrusion plates have bodily exchanged planes along which the streams of strand-forming material are extruded therefrom. Such extrusion plates are now again moved transversely to the direction of extrusion, with the openings therein being aligned with the elongated slots to provide for continuity of extrusion of strand-forming material therefrom.

During this last-described movement, all of the extrusion plates, except the two outermost of such plates, travel in the same direction transversely to the direction of extrusion after each shift thereof from over one of the elongated slots in the housing bottom wall to the other thereof. On the other hand, the two outermost extrusion plates are manipulated to effect reversal in their directions of travel as they are shifted from over one of the elongated slots in the housing bottom wall to a location over the other of such elongated slots.

Upon repeating the above steps and setting of the extruded streams, a woven web or net-like structure is provided. It will be noted that during the movement of the extrusion plates transversely within and perpendicularly to the parallel planes of extrusion, the openings in the extrusion plates are aligned with the elongated and cross slots in the bottom wall of the housing so that continuous streams of strand-forming material issue therefrom. Movement of the extrusion plates in opposite directions along the respective elongated slots in the bottom wall of the housing provides for crossing of the streams of strand-forming material which are extruded from the openings thereof without actual contact between such streams. On the other hand, the movement of the extrusion plates along the cross slots in the housing bottom wall, with adjacent of such extrusion plates moving in opposite directions provides for the movement of streams bodily from each plane of extrusion to the other thereof and, achieves an interlacing of extruded streams, again without actual contact therebetween. In the resulting product, the strands remain unbonded to each other but are interlaced giving the product a woven or net-like construction.

In the operation of the described apparatus, the transverse movement of extrusion plates in the parallel planes of extrusion may be varied so that streams extruded in one vertical plane each cross, for example, periodically with more than one stream extruded in an adjacent vertical plane and thus provide net-like structures with different weave patterns. The movement of the extrusion plates in directions perpendicular to the parallel planes of extrusion may also be varied to provide net-like structures of different bulkiness. The openings in the extrusion plates may be of any desired size, as determined by the widths of the elongated and cross slots in the housing bottom wall, and of any desired cross-section, such as round, oval, square, Y-shaped, etc. Further, the openings in the different extrusion plates may be varied in size and/or cross-section to impart a decorative effect to the finished web or structure.

The teachings of the present invention are applicable for use with a variety of fiber-forming materials, which are referred to by the terms "plastic" and "strand-forming materials," including polyolefins, such as polyethylene, polypropylene, polybutylene, polystyrene, polystyrene-acrylonitrile blends, acrylonitrile butadiene-styrene blends, acrylonitrile-butadiene copolymers, polybutene, polyisobutylene, polyisoprene, and isobutylene isoprene copolymers;

halogenated olefins, such as polyfluoroethylene, polychlorofluoroethylene, polychlorofluoropropylene, polyvinyl chloride, polyvinylidene chloride, polyvinyl chloride-acetate copolymer, polyvinyl chloride-polypropylene copolymer, polychloroprene, fluorinated ethylene-propylene copolymers, vinylidene fluoride-chlorotrifluoroethylene copolymers, and vinylidene fluoride-hexafluoropropylene copolymers; polyesters, such as polyethylene terephthalate and copolymers thereof and polycarbonate; polyamides, such as polyhexamethyl adipamide, polycaprolactam, polyhexamethylene sebacamide, poly-aminoundecanoic acid; polyvinyl acetates; chlorinated polyethers, such as, ethylacrylate-chloroethylene vinyl ether copolymer; acrylic resins, such as polyacrylonitrile, polyacrylates and methacrylates; natural rubbers; compounded silicones; polyurethanes; polyethers; such as polyformaldehyde, formaldehyde-ethylene oxide copolymers, and polytrioxane; polysulfur resins, such as polysulfones and polysulfides; water-soluble, alkali soluble, and organic solvent-soluble cellulose esters and ethers, such as cellulose nitrate, cellulose acetate, cellulose butyrate, cellulose propionate, ethyl cellulose, viscose or cellulose xanthate, cuproammonium cellulose, and carboxymethyl cellulose; glasses; metals, etc. Such materials may include various additives such as stabilizers, dyes, foaming agents, etc., if so desired.

The manner in which the extruded streams are set will depend upon the particular "plastic" or "strand-forming material" employed. For example, extruded streams of molten thermoplastic material may be quenched by being immersed in cooled water or flows of cool air, while extruded streams of viscose may be set by being passed through a regenerating liquid. Preferably, but not necessarily, at least the surfaces of the extruded streams of strand-forming material are set at least along the surfaces thereof prior to contact between the same at their locations of crossing.

For a greater understanding of this invention, reference is made to the following detailed description and drawing in which FIG. 1 is a horizontal view taken through one embodiment of apparatus employed in the method of the present invention, with portions thereof being broken away;

Figure 1:
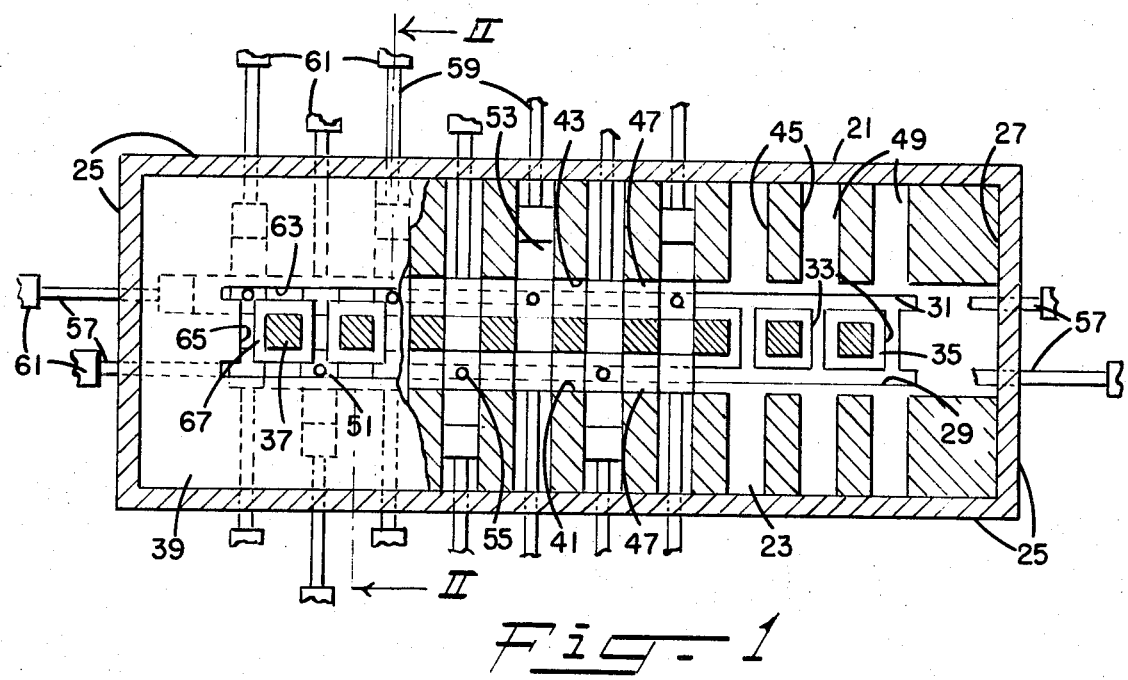
Figure 2:
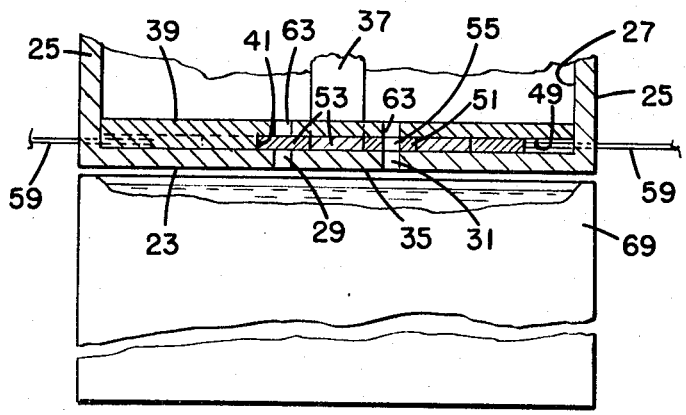
FIG. 2 is a vertical section taken along the line II—II of FIG. 1.

With reference to FIGS. 1 and 2 of the drawing, the apparatus there illustrated includes an elongated housing 21 having a bottom wall 23, top wall, not shown, and side walls 25 which together define a chamber 27. A pair of elongated, parallel slots 29 and 31 are formed in the bottom wall 23 and a series of cross slots 33 extend perpendicularly between the elongated slots 29 and 31. The elongated slots 29 and 31 extend beyond the outermost of the series of cross slots 33 and the cross slots themselves are equally spaced so that rectangular, and more particularly, square portions 35 of the bottom wall 23 are separated from the remainder of such bottom wall. These square portions 35 are mounted in fixed position by rigid supports 37 which depend from the housing top wall.

Resting upon the housing bottom wall 23 is a partition 39, the underside of which is formed with a pair of like longitudinal grooves 41 and 43 and a series of like transverse grooves 45. All of these grooves are of like width and together with the housing bottom wall 23 and supports 37 define longitudinal passages 47 and transverse passages 49. Extrusion plates 51 and filler or spacer plates 53, all of which are of like size and square configuration, together cover the elongated and cross slots 29, 31 and 33 in the housing bottom wall. An opening 55 is provided in each of the extrusion plates 51 which is at all times aligned with either a longitudinal or cross slot in the housing bottom wall. Movement of the extrusion and filler plates within the passages 47 and 49 is effected by push rods 57 and 59 which are driven by cams 61 in a predetermined sequence as hereafter described.

Included also in the partition 39 are elongated slots 63 and cross slots 65 which conform in size and are aligned with the corresponding longitudinal slots 29 and 31 and cross slots 33 in the housing bottom wall. Square portions 67 of the partition 39 are separated from the remainder thereof and are fixed in place by the rigid supports 37.

The filler plates 53 serve to maintain the extrusion plates in desired spaced relationship throughout their movements along the slots in the housing bottom wall and also insure that such slots are covered when extrusion plates are moved to and from the elongated and cross slots.

Figures 3, 4, 5, 6, 7, 8:
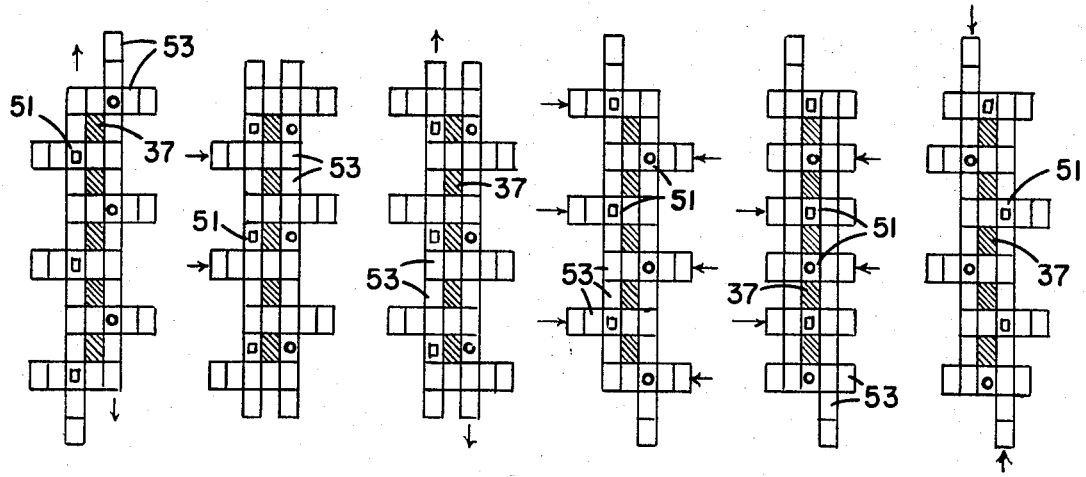
FIGS. 3 through 13 are diagrammatic plan views illustrating the positions of elements of the apparatus shown in FIG. 1 at various steps or stages during the practice of the method of the present invention.

Operation of the above-described apparatus may be commenced with the extrusion and filler plates positioned, for example, as shown in FIGS. 1 and 3. In FIGS. 3–13 the areas occupied by the supports 37 have been cross-hatched and openings of square and round configuration have been used in the extrusion plates 51 to better illustrate their paths of travel. In their starting positions, it will be noted that the extrusion plates 51 are located in alternate relationship over the longitudinal slots 29 and 31 of the housing bottom wall and that adjacent extrusion plates 51 over the respective slots 29 and 31 are spaced apart by three filler plates 53. Filler plates 53 are also located above the cross slots 33 in the housing bottom wall and in those portions in the longitudinal and transverse passages 47 and 49 which are directly adjacent to an extrusion plate 51.

With the extrusion and filler plates disposed as described above, flowable strand-forming material, such as molten polypropylene, is delivered to and maintained under pressure within the housing chamber 27. This flowable strand-forming material is discharged from the openings 55 of extrusion plates 51 as continuous streams, with the streams issuing from the extrusion plates positioned over the respective housing slots 29 and 31 being located in substantially parallel vertical planes. Once extruded from the apparatus, the streams are quenched as by a bath of cool water 69.

The cams 61 are then set in operation to actuate the push rods 57 alternately with the push rods 59 so that filler plates alone or together with extrusion plates are moved along the longitudinal passages 47 alternately with the movements of filler plates alone or together with extrusion plates along the transverse passages 49. More particularly, the rods 57 which are shown in retracted positions in FIG. 1 are projected a distance equal to the length of one side of a filler plate 53 while the other of such push rods 57 are simultaneously retracted like distances. The push rods 59 remain stationary and thus the extrusion and filler plates in the respective longitudinal passages 47 are moved in opposite directions from their positions as shown in FIG. 3 to that shown in FIG. 4. Strand-forming material continuously extrudes from the openings 55 in the respective extrusion plates 51 during their movement, with the extruded streams being disposed in substantially parallel vertical planes.

In their positions shown in FIG. 4, the extrusion plates 51 are located within those portions of the longitudinal passages 47 which are between the transverse passages 49 and are thus aligned laterally with alternate of the supports 37. With the extrusion plates 51 stationary, the push rods 59 which are illustrated in retracted positions in FIG. 1 are projected into the housing while the push rods 59 opposing such retracted push rods are simultaneously withdrawn a distance equal to twice the length of a side of a filler 53. By this movement, the filler plates 53 are moved along the transverse passages 49 from positions as shown in FIG. 4 to that shown in FIG. 5.

The push rods 57 are now again actuated to urge the extrusion plates 51 along the passages 47 to the same degree and in the same directions as during their previous movement along such passages. The extrusion and filler plates are now in locations as shown in FIG. 6, with the extrusion plates 51 being aligned with push rods 59. Of particular importance is that during the movement of the extrusion plates 51 from positions shown in FIG. 3 to that shown in FIG. 6, the continuous streams of strand-forming material issuing from the openings in the extrusion plates which are moved along one of the passages 47 cross but do not contact with the like continuous streams of strand-forming material issuing through the extrusion plates 51 which are moved along the other of such passages 47.

All of the extrusion plates 51 and the filler plates 53 which are aligned therewith are now moved by push rods 59 perpendicularly to the direction of extrusion along the transverse passages 49 into positions as shown in FIG. 7. With the exception of the push rods 59 acting upon the outermost extrusion plates 51, movement of the other push rods 59 is continued to urge the remaining extrusion plates 51 into positions as shown in FIG. 8. Upon completion of this last movement it may be seen that, except for the outermost extrusion plates 51, the remaining extrusion plates 51 have been moved from a position in one of the passages 47, as shown in FIG. 1, into a position in the other of such passages 47, as shown in FIG. 8.

During the above-described sequence of movements of these extrusion plates 51, the continuous streams issuing from the openings 55 thereof, cross each other in the parallel planes of extrusion, as shown in FIGS. 4, 5 and 6, and also cross with each other when moved perpendicularly to such planes, as shown in FIGS. 7 and 8. There is no contact between streams as they move past each other and, as a result of such crossing of streams, the strands provided after these streams are set are interlaced with each other.

Figures 9, 10, 11, 12, 13:
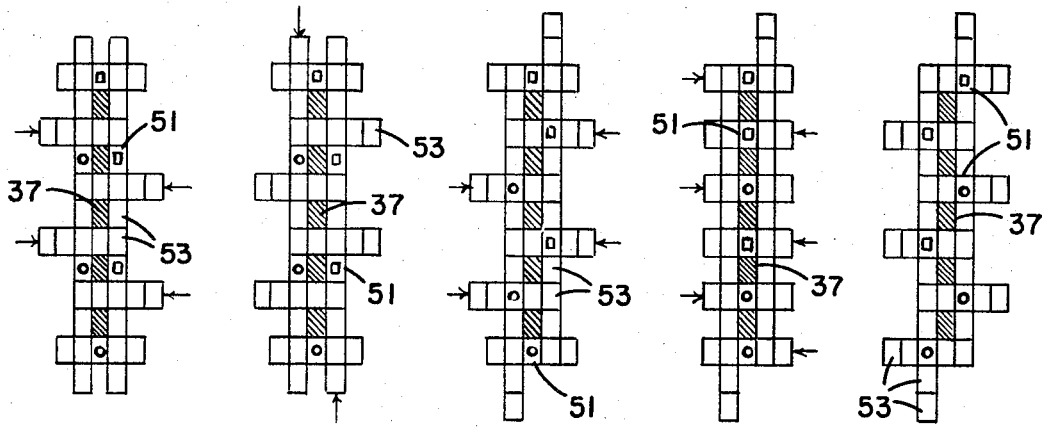

During the steps or stages of the method illustrated in FIGS. 9-12, the outermost extrusion plates 51 remain stationary while the remainder of such extrusion plates are moved transversely in the respective parallel planes of extrusion, as shown in FIGS. 9 and 11, and then perpendicularly thereof, as shown in FIG. 12. More particularly, from their positions as shown in FIG. 8, the extrusion plates 51 between the outermost of such extrusion plates are moved by the push rods 57 in opposite directions along the longitudinal passages 47 a distance equal to the length of one side of the filler plate 53. It will be noted that during this movement the respective extrusion plates 51 travel in the same direction in their respective planes of extrusion as they did during the steps illustrated in FIGS. 4 and 6, although such respective extrusion plates 51 are now in different longitudinal passages 47 then they heretofore occupied as a result of the steps illustrated in FIGS. 6 and 7.

In their positions shown in FIG. 9, the extrusion plates 51 between the outermost of such plates are aligned laterally with the supports 37. The push rods 59 are now actuated to urge a pair of filler plates 53 along each of the transverse passages 49, except the end ones thereof, and into positions as shown in FIG. 10. Movement of the extrusion plates 51 which are between the outermost of such plates, is then effected by the push rods 57 whereupon such plates 51 are now located within transverse passage 49, as illustrated in FIG. 11. As a result of movement of these particular extrusion plates from positions shown in FIG. 8 to that shown in FIG. 11, the strands issuing from the openings 55 in such plates 51 cross with each other without contacting.

From their locations as shown in FIG. 11, the extrusion plates 51 which are between the outermost of such plates, are now moved transversely by the push rods 59 into positions as shown in FIG. 12 whereupon all of the extrusion plates 51 are in longitudinal alignment. All of the extrusion plates 51 are now urged by the push rods 59 into positions as shown in FIG. 13, in which the extrusion plates 51 assume positions similar to that at which operations were started as shown in FIG. 3.

During movement of the extrusion plates 51 from their positions as shown in FIG. 11 to that shown in FIG. 13, the continuous streams of strand-forming material issuing from the openings 55 thereof cross without any contact between such streams. By repeating the above steps and, upon setting of the continuously extruded streams of strand-forming material, the resulting web or structure exhibits a woven or net-like construction.

I claim:

1. A method of making a woven web by extrusion including the steps of continuously extruding in a vertical direction from individual extrusion openings a series of spaced streams of flowable strand-forming material in each of two laterally spaced, generally parallel planes, with the streams in one of such planes being staggered with relation to the streams in the other of such planes, simultaneously moving streams like distances in each of the parallel planes at their points of extrusion by shifting individual extrusion openings first transversely in such planes, with streams in one of such planes moving in a direction opposite to and crossing with streams in the other of such planes, and then perpendicularly to such planes, with individual streams moving bodily from each of such planes to the other thereof, continuously repeating the above sequence of steps and setting the extruded streams to provide a woven pattern of strands.

2. A method as defined in claim 1 wherein each series includes a like number of streams and wherein the spacing between certain of the streams in both series is substantially the same.

3. A method as defined in claim 2 wherein each movement of streams in a direction transversely in the planes of extrusion is equal to at least one half of the spacing between adjacent streams in the respective series of streams.

4. A method as defined in claim 2 wherein streams between outermost streams of the two series of streams are moved in the same direction transversely in the planes of extrusion after each movement thereof from one plane to the other.

5. A method as defined in claim 4 wherein the transverse movement of the outermost streams of the two series of streams is reversed after such streams have been moved from one plane to the other thereof.

6. A method as defined in claim 1 wherein the extruded streams are set at least along the surface thereof prior to any contact therebetween.

7. A method as defined in claim 1 wherein the extruded streams are set after contact therebetween.

* * * * *